2,991,295
11β-HYDROXY-17α-ALKYL ESTROGENS AND INTERMEDIATES IN THE PRODUCTION THEREOF

Barney J. Magerlein, Kalamazoo, and John A. Hogg, Kalamazoo Township, Kalamazoo County, Mich., assignors to The Upjohn Company, Kalamazoo, Mich., a corporation of Michigan
No Drawing. Filed Aug. 21, 1956, Ser. No. 605,442
7 Claims. (Cl. 260—397.5)

This invention relates to steroid chemistry and is more particularly concerned with novel processes for the production of the physiologically active 11β-hydroxy-17α-alkyl-19-nortestosterones (U.S. 2,735,854) from steroids having an aromatic A-ring and to certain novel compounds produced thereby. It is an object of the present invention to provide the novel processes and compounds described herein which are useful in the production of 11β-hydroxy-17α-alkyl-19-nortestosterones. Other objects and uses will be apparent to one skilled in the art.

The process of this invention, illustrated by the following equation wherein $R^1$ is alkyl and $R^2O$ is an ether radical, comprises: reacting the 17-carbonyl group of 3-etherified 3,11β-dihydroxy-1,3,5(10)-estratrien-17-one (I) with alkyl magnesium halide Grignard reagent to produce 3-etherified 17α-alkyl-1,3,5(10)-estratriene-3,11β,17β-triol (II); chemically reducing the A-ring of the thus-obtained 17α-alkyl compound (II) with lithium, liquid ammonia and an alcohol to produce 3-etherified 17α-alkyl-2,5(10)-estradiene,3,11β-triol (III); and hydrolyzing and isomerizing the thus-obtained diene (III) by heating with an acid hydrolyzing agent to produce 11β-hydroxy-17α-alkyl-19-nortestosterone (IV). The 11β-hydroxy-17α-alkyl-19-nortestosterone (IV) also can be obtained from 3-etherified 17α-alkyl-2,5(10)-estradiene-3,11β,17β-triol (III) by reacting with an acid hydrolyzing agent at room temperature to produce 17α-alkyl-11β,17β-dihydroxy-5(10)-estren-3-one and isomerizing the 5(10)-double bond of the thus-obtained 3-keto compound by reacting with a base

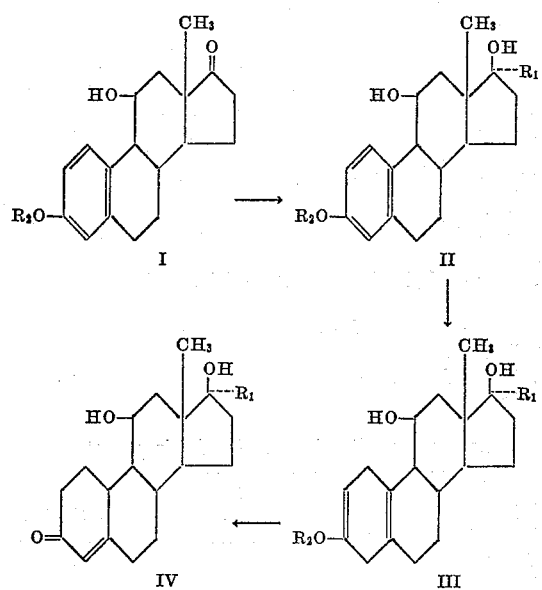

(e.g. sodium methoxide in methanol, sodium hydroxide in ethanol, etc.) or by heating with an acid hydrolyzing agent. The starting 3-etherified 3,11β-dihydroxy-1,3,5(10)-estratrien-17-one (I) is prepared as described in copending application Serial No. 406,364, filed January 26, 1954.

In the processes of the present invention the exact nature of the ether radical ($R^2O$ in the foregoing equation) is immaterial, but generally said ether radical contains less than forty atoms. Preferably said radical is hydrocarbonoxy [hydrocarbon—O—] containing less than twelve carbon atoms. In an especially preferred embodiment of this invention said radical is alkoxy containing less than nine carbon atoms. The most preferred embodiment of said radical is methoxy. Illustrative ether radicals are methoxy, ethoxy, propoxy, butyroxy, valeroxy, hexoxy, heptoxy, octanoxy, dimethylmethoxy, diethylmethoxy, isobutyroxy, isovaleroxy, α-tetrahydropyranyloxy, α and β-naphthyloxy, cyclohexyloxy, cyclopentyloxy, β,β-dicarbethoxyethenyloxy, β-ketocyclohexenyloxy, α,β-dimethylethoxy, α,β and β,β-diethylethoxy, benzoxy, ortho, meta and paratolyloxy, α and β-phenylethyloxy, β-indolyloxy, α-furyloxy, α and β-cyclohexylethyleneoxy, ortho, meta and para-aminobenzoxy, etc. In the process of the present invention the alkyl radical ($R^1$ in the foregoing equation) generally contains less than nine carbon atoms and preferably contains less than five carbons. Especially preferred are alkyl radicals containing less than three carbon atoms with methyl being the most preferred alkyl radical. Illustrative alkyl radicals are methyl, ethyl, propyl, butyl, isobutyl, pentyl, hexyl, heptyl, octyl, isooctyl, etc.

In carrying out the process of the present invention 3-etherified 3,11β-dihydroxy-1,3,5(10)-estratrien-17-one (I) is alkylated by the Grignard method at the 17-carbon atom by heating with alkyl magnesium halide Grignard reagent (e.g. methyl bromide or iodide, ethyl chloride, bromide, or iodide, etc.) using a suitable solvent (e.g. ether, benzene, toluene, etc.) to produce 3-etherified 17α-alkyl-1,3,5,(10)-estratriene-3,11β,17β-triol (II), the hydrolysis of the Grignard addition compound being carried out according to conventional prior art procedure as illustrated by the preferred procedures of Examples 1 and 2; the 17α-alkylation can also be conducted by using an alkyl lithium compound for the Grignard reagent, and this method is sometimes preferred. The 3-etherified 17α-alkyl-1,3,5(10)-estratriene-3,11β,17β-triol (II) is chemically reduced by the Birch reduction method with lithium (or sodium or potassium), an alcohol (preferably a lower-alkanol containing less than six carbon atoms, e.g. methanol, ethanol, isopropanol, etc.); and liquid ammonia, a solvent (e.g. tetrahydrofuran, dioxane, etc.) being employed when necessary to obtain a homogeneous solution, to produce 3-etherified 17α-alkyl-2,5(10)-estradiene-3,11β,17β-triol (III), preferred procedures being given in Example 3 and 4. Hydrolyzing and isomerizing 3-etherified 17α-alkyl-2,5(10)-estradiene-3,11β,17β-triol (III) to obtain 11β-hydroxy-17α-alkyl-19-nortestosterone (IV) is accomplished (preferred procedures in Examples 5 and 6) by heating (suitably 65 to 125 degrees centigrade) suitably for fifteen minutes to four hours with an acid hydrolyzing agent, e.g. aqueous mineral acid (e.g. dilute sulfuric acid or the preferred dilute hydrochloric acid, etc.) or aqueous organic acid (e.g. fifty percent aqueous acetic acid, aqueous formic acid, etc.) of suitable acid strength using, if necessary, an organic solvent (e.g. methanol, ethanol, dioxane, etc.) to obtain a homogeneous reaction mixture, the shorter reaction periods and/or lower reaction temperatures usually being preferred when mineral acids are employed. The isolation and purification of the compounds of the foredescribed processes is accomplished by conventional procedures as illustrated by Examples 1 through 6.

The following examples are illustrative only and are not to be construed as limiting the scope of the present invention.

3

*Example 1. 17α-methyl-3-methoxy-1,3,5(10)-estratriene-11β,17β-diol*

A solution of 160 milligrams of 3-methoxy-1,3,5(10)-estratrien-17-one, two milliliters of four-molar methyl magnesium bromide solution in ether, and 25 milliliters of benzene is heated under reflux for seventeen hours. The reaction mixture then is poured onto hydrochloric acid-ice mixture and the product extracted with methylene chloride. Evaporation of the methylene chloride provides 169 milligrams of crude product. Recrystallization from ethyl acetate-hexane (Skellysolve B) mixture provides ninety milligrams of 17α-methyl-3-methoxy-1,3,5(10)-estratriene-11β,17β-diol, melting point 155 to 158 degrees centigrade. Further recrystallization from the same solvent provides highly purified material melting at 159 to 161 degrees centigrade.

*Analysis.*—Calculated for $C_{20}H_{28}O_3$: C, 75.91; H, 8.92. Found: C; H.

*Example 2. 17α-ethyl-3-methoxy-1,3,5(10)-estratriene-11β,17β-diol*

By substituting ethyl magnesium bromide (or iodide) for the methyl magnesium bromide in the procedure of Example 1, the starting 3-methoxy-1,3,5(10)-estratrien-17-one is alkylated to produce 17α-ethyl-3-methoxy-1,3,5(10)-estratriene-11β,17β-diol. The crude 17α-ethyl compound is isolated and purified in the same manner as described for the corresponding 17α-methyl compound in Example 1.

In the same manner as shown in Examples 1 and 2, other 3-etherified 3,11β-dihydroxy-1,3,5(10)-estratrien-17-ones are converted to other 3-etherified 17α-alkyl-1,3,5(10)-estratriene-3,11β,17β-triols by reacting with the appropriate alkyl magnesium halide, including those wherein the 3-ether, alkyl, and halide radicals are those specified in the foregoing description.

*Example 3. 17α-methyl-3-methoxy-2,5(10)-estradiene-11β,17β-diol*

A solution of 380 milligrams of 17α-methyl-3-methoxy-1,3,5(10)-estratriene-11β,17β-diol in ten milliliters of dioxane, eighty milliliters of liquid ammonia, and 2.5 milliliters of ethanol is prepared and 250 milligrams of lithium metal is added. After the lithium metal has reacted the solvent is evaporated from the resulting solution. Water then is added to the residue and the product is extracted with methylene dichloride. Evaporation of the methylene dichloride solvent provides crude crystalline 17α-methyl-3-methoxy-2,5(10)-estradiene-11β,17β-diol. Pure product is obtained by recrystallization from ethyl acetate-hexane (Skellysolve B).

*Example 4. 17α-ethyl-3-methoxy-2,5(10)-estradiene-11β,17β-diol*

A solution of 17α-ethyl-3-methoxy-1,3,5(10)-estratriene-11β,17β-diol in dioxane, liquid ammonia, and ethanol reacted with lithium metal according to the procedure of Example 3 provides 17α-ethyl-3-methoxy-2,5(10)-estradiene-11β,17β-diol.

Following the procedures of Examples 3 and 4, other 3-etherified 17α-alkyl-1,3,5(10)-estratriene-3,11β,17β-triols are chemically reduced to other 3-etherified 17α-alkyl-2,5(10)-estradiene-3,11β,17β-triols, including those wherein the 3-ether and 17α-alkyl radicals are those specified in the foregoing description.

*Example 5. 11β-hydroxy-17α-methyl-19-nortestosterone*

The crude crystalline 17α-methyl-3-methoxy-2,5(10)-estradiene-11β,17β-diol obtained according to the procedure of Example 3 is dissolved in twenty milliliters of methanol containing two milliliters of water and one-half milliliter of concentrated hydrochloric acid. The resulting solution is heated under reflux for fifteen minutes. Then excess sodium acetate is added and the methanol distilled under vacuum. The product is extracted from the residue with methylene dichloride. Evaporation of the methylene dichloride solvent provides 140 milligrams of 11β-hydroxy-17α-methyl-19-nortestosterone melting at 216 to 222 degrees centigrade. Recrystallization from ethyl acetate gives purified product melting at 219 to 224 degrees centigrade.

*Analysis.*—Calculated for $C_{19}H_{28}O_3$: C, 74.96; H, 9.27. Found: C, 74.92; H, 9.36.

*Example 6. 11β-hydroxy-17α-ethyl-19-nortestosterone*

Treatment of 17α-ethyl-3-methoxy-2,5(10)-estradiene-11β,17β-diol with hydrochloric acid in aqueous methanol solution according to the procedure of Example 5 provides 11β-hydroxy-17α-ethyl-19-nortestosterone, melting point 164 to 167 degrees centigrade.

In the same manner as shown in Examples 5 and 6, other 3-etherified 17α-alkyl-2,5(10)-estradiene-3,11β,17β-triols are hydrolyzed and isomerized by heating with hydrochloric acid in aqueous methanol to provide other 11β-hydroxy-17α-alkyl-19-nortestosterones, including those wherein the 3-ether and 17α-alkyl radicals are those specified in the foregoing description.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. An unsaturated 3-etherified 17α-alkylestrane-3,11β,17β-triol selected from the group consisting of compounds of the formulae

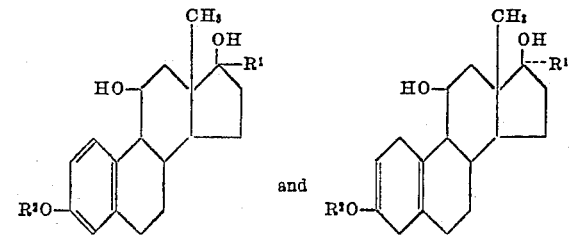

wherein $R^2O$ is a hydrocarbonoxy radical containing less than twelve carbon atoms and $R^1$ is an alkyl radical containing less than nine carbon atoms.

2. 3 - etherified 17α - alkyl - 1,3,5(10) - estratriene-3,11β,17β-triol wherein the 3-ether radical is alkoxy containing less than nine carbon atoms and the 17α-alkyl radical contains less than five carbon atoms.

3. 3 - etherified 17α - alkyl - 2,5(10) - estradiene - 3,11β,17β-triol wherein the 3-ether radical is alkoxy containing less than nine carbon atoms and the 17α-alkyl radical contains less than five carbon atoms.

4. 17α-methyl-3-methoxy-1,3,5(10)-estratriene-11β,17β-diol.

5. 17α - ethyl - 3 - methoxy - 1,3,5(10) - estratriene-11β,17β-diol.

6. 17α - methyl - 3 - methoxy - 2,5(10) - estradiene-11β,17β-diol.

7. 17α - ethyl - 3 - methoxy - 2,5(10) - estradiene - 11β,17β-diol.

References Cited in the file of this patent

UNITED STATES PATENTS

| | | |
|---|---|---|
| 2,655,518 | Colton | Oct. 13, 1953 |
| 2,698,855 | Hicks | Jan. 4, 1955 |
| 2,735,854 | Herr | Feb. 21, 1956 |
| 2,744,122 | Djerassi | May 1, 1956 |
| 2,753,342 | Djerassi | July 3, 1956 |
| 2,774,775 | Korman | Dec. 18, 1956 |

OTHER REFERENCES

Fieser et al.: Natural Products Related to Phenanthrene, 3rd ed., 1949, Reinhold Pub. Corp., New York, p. 376.